United States Patent
Nizzere et al.

(10) Patent No.: US 7,829,801 B2
(45) Date of Patent: Nov. 9, 2010

(54) SCALE WITH REMOVABLE HOUSING

(75) Inventors: Paul D. Nizzere, Darien, IL (US);
Matthew H. Lawler, Homerglen, IL (US); Carla DeYoung, Joliet, IL (US);
Chris Kulujian, Chicago, IL (US);
Morad Ghassemian, Oak Park, IL (US);
Theron Kotze, Chicago, IL (US);
Timothy A. Bearint, Mokena, IL (US)

(73) Assignee: Rubbermaid Incorporated, Huntersville, NC (US)

( * ) Notice: Subject to any disclaimer, the term of this patent is extended or adjusted under 35 U.S.C. 154(b) by 276 days.

(21) Appl. No.: 10/590,815

(22) PCT Filed: Feb. 28, 2005
(Under 37 CFR 1.47)

(86) PCT No.: PCT/US2005/006414
§ 371 (c)(1),
(2), (4) Date: Sep. 19, 2008

(87) PCT Pub. No.: WO2005/084269
PCT Pub. Date: Sep. 15, 2005

(65) Prior Publication Data
US 2009/0139776 A1    Jun. 4, 2009

Related U.S. Application Data

(60) Provisional application No. 60/548,712, filed on Feb. 27, 2004.

(51) Int. Cl.
*G01G 21/10* (2006.01)
*G01G 21/28* (2006.01)

(52) U.S. Cl. ................ 177/184; 177/187; 177/238

(58) Field of Classification Search .......... 177/180, 177/184, 187, 238, 239–244
See application file for complete search history.

(56) References Cited

U.S. PATENT DOCUMENTS 776,725 A * 12/1904 Chatillon ............ 177/187

(Continued)

FOREIGN PATENT DOCUMENTS

CN    2226283    5/1996

(Continued)

OTHER PUBLICATIONS

Supplementary European Search Report issued in related European Patent Application No. 05724043.4 mailed Mar. 26, 2008.
Office Action from counterpart Chinese Patent Application No. 200910126228.4 dated Mar. 2, 2010.

*Primary Examiner*—Randy W Gibson
(74) *Attorney, Agent, or Firm*—Lempia Braidwood LLC (57) ABSTRACT

The scale may include a base supportable on a surface, a measuring mechanism supported by the base and operable to measure a characteristic of an object, the measuring mechanism including a measuring platform on which the object is supportable, and an indicator supported by the housing, the indicator being operable to provide feedback to a user relating to a measured characteristic of the object. In some aspects, the scale may include a housing supported by the base, the housing cooperating with the base to cover at least a portion of the measuring mechanism, and a connecting assembly operable to removably connect the housing to the base. In some aspects, the scale may include a resistance device coupled to at least one of the indicator and the measuring mechanism and operable to resist oscillation of the indicator at least one of during a measurement and after a measurement. In some aspects, the scale may include a cylinder supported by the housing, and a piston connected to the platform for movement with the platform, the piston engaging the cylinder to provide a piston and cylinder assembly, the assembly being operable to resist movement of the platform at least one of during a measurement and after a measurement.

28 Claims, 12 Drawing Sheets

U.S. PATENT DOCUMENTS

| | | | |
|---|---|---|---|
| 1,457,328 A | | 6/1923 | Van Berkel |
| 1,889,948 A | * | 12/1932 | Chatillon .................... 177/186 |
| 2,411,521 A | * | 11/1946 | Carliss ....................... 177/186 |
| 2,565,431 A | * | 8/1951 | Karp .......................... 177/230 |
| 2,610,845 A | * | 9/1952 | Bengtsson .................. 177/186 |
| 3,985,190 A | * | 10/1976 | Kammerer et al. .......... 177/184 |
| 4,219,089 A | * | 8/1980 | Gard et al. .................. 177/165 |
| 4,838,367 A | * | 6/1989 | Tsai ........................ 177/25.15 |
| 4,848,495 A | * | 7/1989 | Hayashi ..................... 177/187 |
| 6,566,614 B1 | | 5/2003 | Fluckiger et al. |

FOREIGN PATENT DOCUMENTS

| | | |
|---|---|---|
| CN | 2241871 | 12/1996 |
| GB | 827212 | 2/1960 |
| GB | 887 429 | 1/1962 |
| WO | WO 02/03449 | 1/2002 |

* cited by examiner

SCALE WITH REMOVABLE HOUSING

RELATED APPLICATIONS

The present application claims priority to co-pending U.S. Provisional Patent Application Ser. No. 60/548,712, filed Feb. 27, 2004, the entire contents of which are hereby incorporated by reference.

FIELD OF INVENTION

This invention relates generally to scales and, more particularly, in some constructions, to relatively compact, table top scales used in the food services industry to measure weights of ingredients, portion sizes, etc.

SUMMARY OF THE INVENTION

In some constructions and in some aspects, the present invention provides a scale generally including a base, a housing coupled to the base, a dial indicator coupled to the housing, and a platform extending upwardly from the housing. The housing can be contoured with curved surfaces and generally smooth transitions between surfaces. The housing can also have a minimum number of recesses, corners, and sharp edges. This design reduces the number of difficult surfaces and areas to clean and subsequently prevents accumulation of dirt and other debris that can promote unhealthy or unsanitary conditions.

In some constructions and in some aspects, to further assist the cleaning process, for example, the housing (or a portions thereof) can be easily removed from the remainder of the scale to be cleaned. The removable housing can be made from dishwasher safe materials to be easily cleaned in a dishwasher. Also, some or all of the internal components can be made dishwasher safe. For example, scale components can be made of dishwasher safe materials, coated with a dishwasher safe material such as Teflon, or removed to make all or some of the scale dishwasher safe. Thus, subsequently the entire apparatus can be cleaned in a dishwasher in an assembled or partially disassembled state.

In some constructions and in some aspects, the scale can generally include a device that provides resistance to the oscillation of the measurement in at least one direction. For example, in some constructions and in some aspects, a damper assembly substantially reduces or eliminates the amount of oscillation of the indicator after a load is placed on or removed from the platform. In other constructions and other aspects, while other embodiment use frictional engagement of parts or inertial resistance reduces or eliminates the amount of oscillation of the indicator after a load is placed on or removed from the platform.

In some constructions and some aspects, the damper assembly can generally include a dashpot having a piston that moves within a fluid filled chamber. The fluid (either hydraulic or pneumatic type fluids) acting on the piston can dampen the shock of a load placed on or removed from the platform and prevent or quickly eliminate oscillation of the platform.

In some constructions and some aspects, a gear or a gear assembly can generally provide both frictional and inertial resistance to oscillation. The gear assembly can include a rack coupled to the platform assembly, a pinion coupled to the dial indicator, and at least one additional gear in communication with the rack and/or pinion. The additional gear can dampen the oscillation of measurements by providing predictable friction and inertia to resist oscillation.

Further independent aspects of the present invention, together with the organization and operation thereof, will become apparent from the following detailed description, claims and drawings.

BRIEF DESCRIPTION OF THE DRAWINGS

The present invention is further described with reference to the accompanying drawings, which show certain constructions of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numeral indicate like parts.

DETAILED DESCRIPTION

A scale 20 is illustrated in FIGS. 1-11 and generally includes a base 23, a housing 26 coupled to the base 23, a dial indicator 29 coupled to the housing 26, and a platform assembly 31 extending upwardly from the housing 26.

In the illustrated construction and for some independent aspects, the housing 26 is contoured with several curved surfaces that have generally smooth transitions between surfaces. In other words, the housing is designed with a minimum number of recesses, corners, and sharp edges. This design reduces the number of hard to clean surfaces, which helps to prevent accumulation of dirt and other debris that can promote unhealthy or unsanitary conditions. However, in other constructions (not illustrated) and for some aspects, a generally conventional design or a design without these generally smooth transitions can be used.

Figure 1:
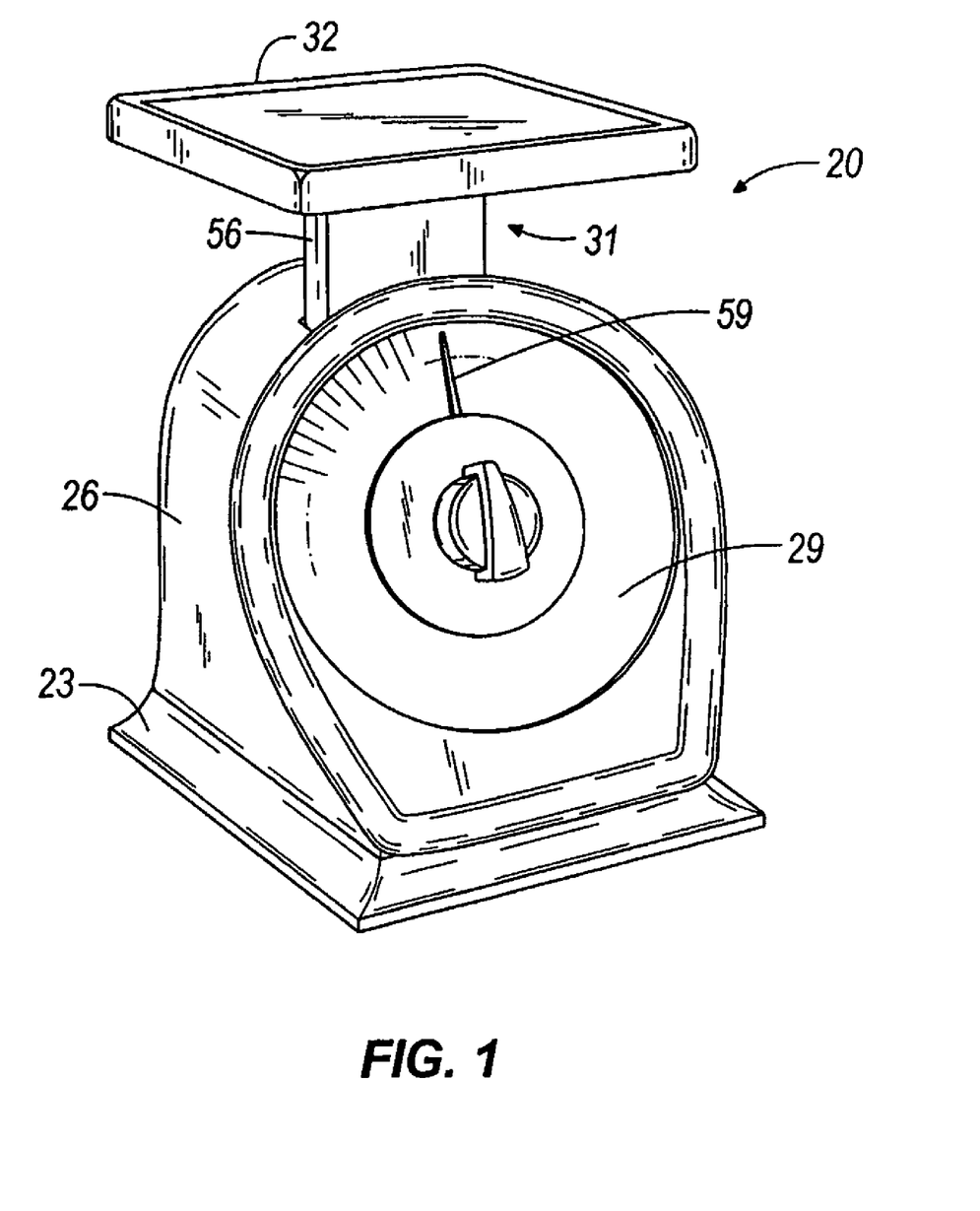
FIG. 1 is a front perspective view of a scale.
Figure 2:
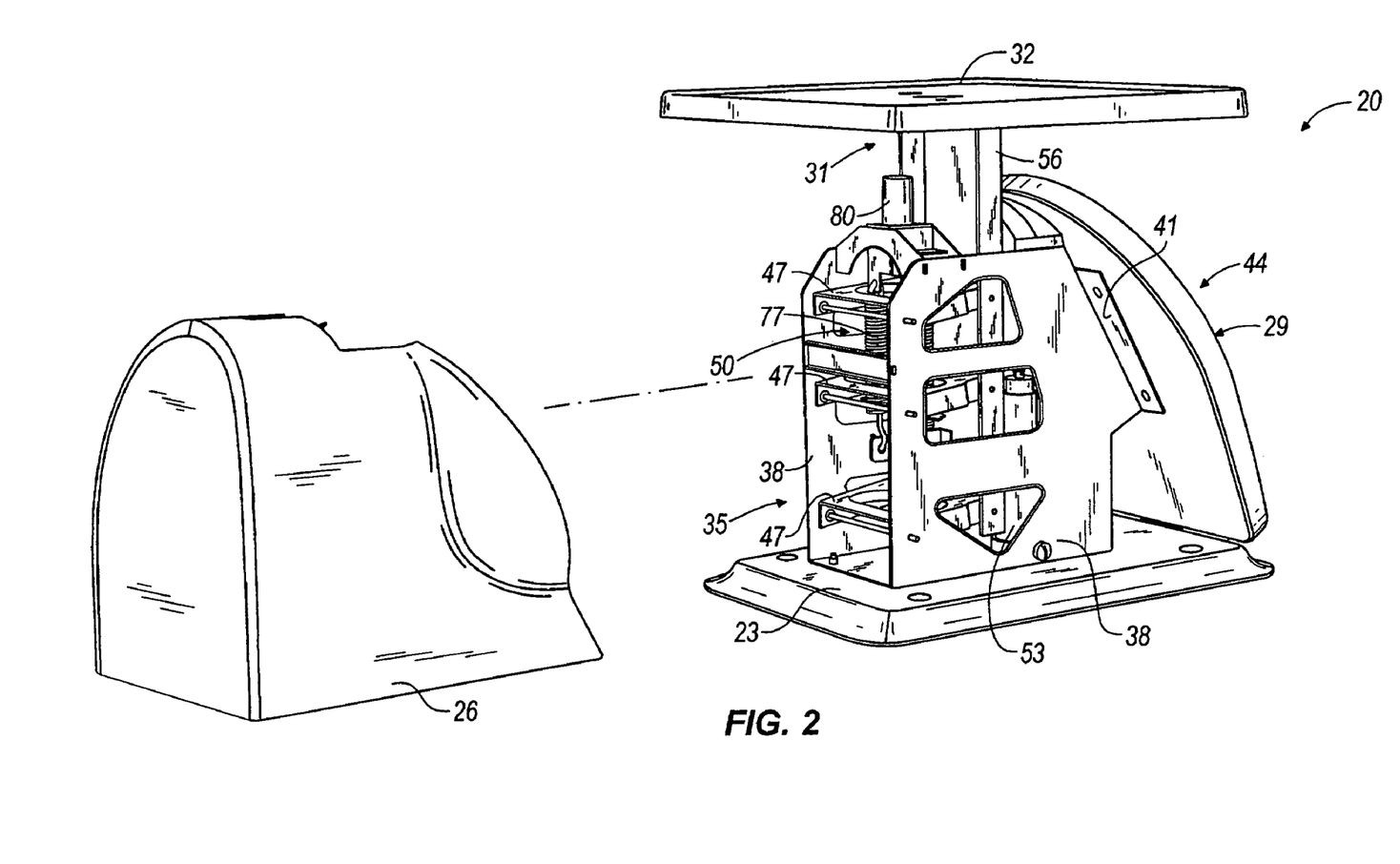
FIG. 2 is an exploded rear perspective view of the scale illustrated in FIG. 1 showing some subassemblies and components of this construction as well as a removable housing for the scale.
Figure 3:
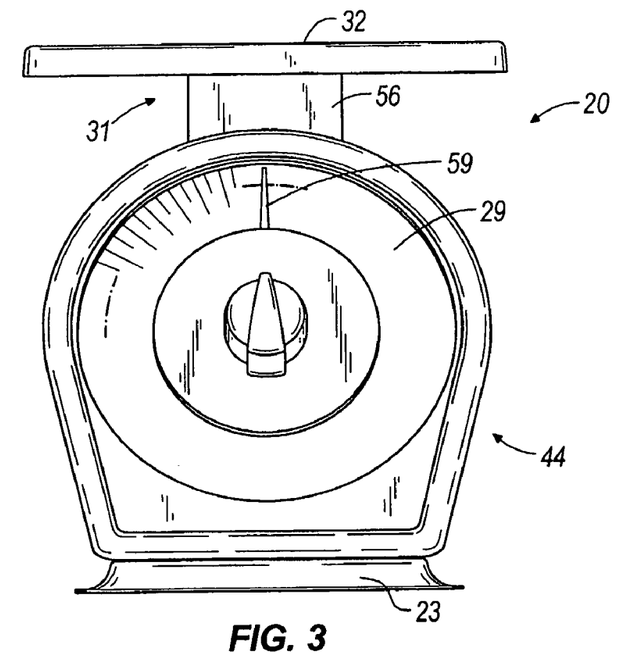
FIG. 3 is a front view of the scale of the shown in FIG. 1.
Figure 4:
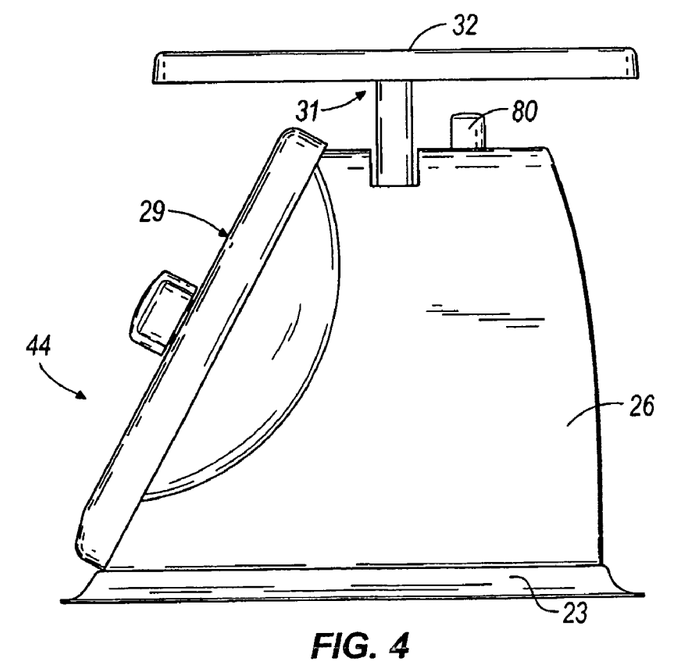
FIG. 4 is a side view of the scale shown in FIG. 1.
Figure 5:
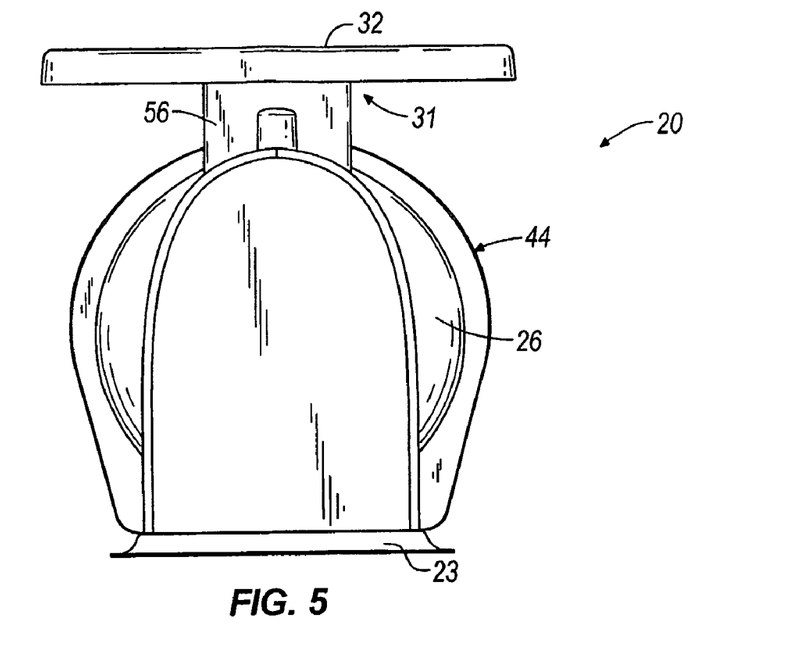
FIG. 5 is a rear view of the scale shown in FIG. 1.
Figure 6:
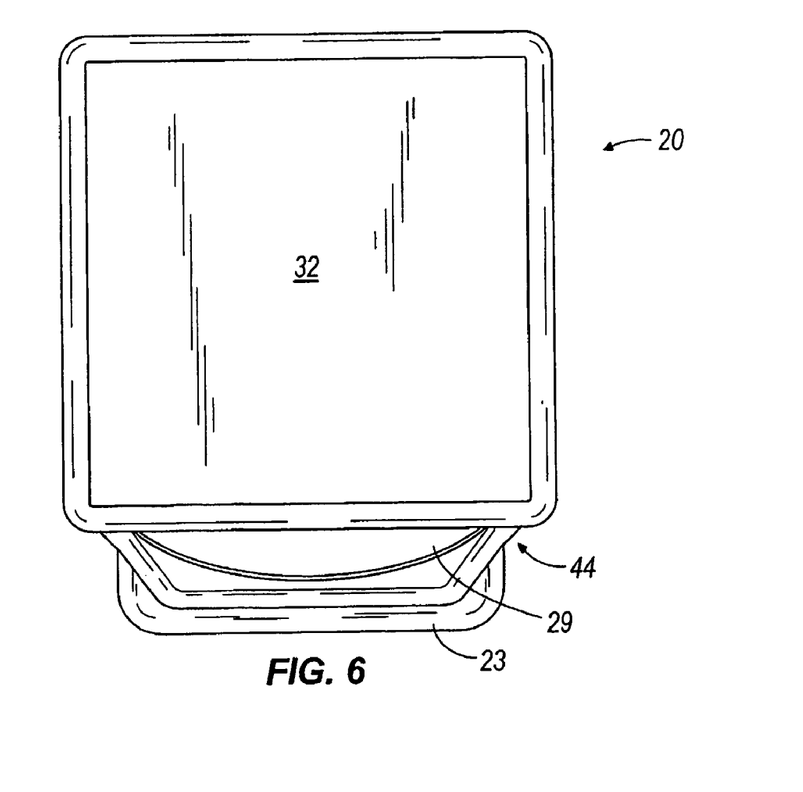
FIG. 6 is a top view of the scale shown in FIG. 1.

As illustrated in FIG. 2, the housing 26 of this construction can be easily removed from the remainder of the scale 20 to be cleaned. The removable housing 26 can be attached to the remainder of the scale 20 by one or more fasteners (not illustrated). For example, threaded fasteners, clips, releasable interference or friction fits, snap fits, mating male/female components, etc. can be used. In one exemplary construction, a plurality of threaded fasteners, such as thumbscrews, extend up though the base 23 and thread into an aperture of the housing 26.

In another construction, portions of the housing (e.g., closest the dial) can be received within an aperture coupled to the base, and at least one other portion can be coupled to the base with a quick release fastener. For example, flanges, tabs, or other projections can extend from the housing near the interface between the base 23 and the housing 26. These flanges can be received within a groove, channel, or slot of the base 23 to prevent vertical movement of the housing 26 while engaged. The quick release fastener can extend upwardly from the base 23 to engage an aperture located in a flange or tab of the rear portion of the housing 26. The quick release fastener and aperture can be designed so that the fastener only needs to be turned a small amount, e.g. about a quarter turn, to secure or release the housing 26. In such constructions, it is preferable that the fasteners remain associated with at least one element of the scale even when the housing is removed. For example, retainers can be used to prevent disengagement of a screw type fastener (for example) from the base 23.

It should be understood, in some constructions, the housing does not need to be fastened to the scale. Rather, the housing can merely rest on the base.

In some constructions, the removable housing 26 is made from dishwasher safe materials, such as stainless steel, to allow easy cleaning. Also, some or all of the internal components can be dishwasher safe. For example, certain components can be made from dishwasher safe materials such as stainless steel, coated with a dishwasher safe material such as Teflon, or removed to make all or some of the scale dishwasher safe. Thus, in some constructions, the scale can be cleaned in a dishwasher in an assembled or partially disassembled state, such as with the housing removed.

Some constructions that are entirely dishwasher safe may require some modifications not shown in the illustrations. For example, the lens (illustrated, but not enumerated) may be omitted. As such, the indicator needle 59 may need to be strengthened to prevent damage to the needle 59. In some constructions, the needle 59 can be made thicker and from stronger materials. In other constructions, the needle 59 may be connected to the face 44 of the scale at both ends. In this construction, the needle remains stationary, while the dial or wheel moves relative to the needle to indicate measurements. Because the wheel would be subject to washing, the markings on the wheel are enhanced to prevent damage or wear to the markings due to the washing. In some constructions, the markings may be etched, imprinted, etc. into the wheel to prevent wear.

Referring now to FIGS. 8-11, the internal components of this construction of the scale 20 can be seen. As illustrated, a frame 35 is coupled to the base 23. The frame 35 supports several components within the housing 26, and in some constructions, can be used to retain the housing 26. Furthermore, the frame 35 protects several of the components contained within the frame 35 when the housing 26 of the scale 20 is removed. In the illustrated construction, when the housing 26 is removed, the frame 35 provides a substantial self-supported structure for the remainder of the scale (e.g., the scale is operable even without the housing 2). The frame 35 can be made of metal, plastic, composites, etc.

The illustrated frame 35 includes two sidewalls 38 with several connection locations. For example, the illustrated sidewalls 38 have a flange 41 extending from each sidewall 38 to support the indicator assembly 44. Also, a plurality of links 47 are coupled to the side walls 38. As will be described in greater detail below, these links 47 are used to support and control the movement of the platform assembly 31. Additionally, the frame 35 can also support structures and assemblies. For example, a spring assembly 50 can be supported by the frame 35 as well as a damper assembly 53.

In other constructions, the frame 35 can be arranged differently than the illustrated frame in some embodiments. For example, the frame 35 can include a front wall, a back wall, or a top wall connected between the sidewalls 38. Additionally, the sidewalls 38 can have more or fewer openings than illustrated, and the openings (if any) can be shaped and positioned differently. For example, an opening can be appropriately sized and positioned to allow access to certain components of the scale 20. As such, some components may be easily removed for servicing, or new components can be added following initial construction.

As discussed above, the platform assembly 31 is coupled to the frame 35 via the links 47. More specifically, the platform 32 is connected to a vertical support 56, which is coupled to the links 47. Although the vertical support 56 can have many constructions, the illustrated vertical support 56 has a channel shape. The sides of the channel are connected to the links 47 to provide controlled movement of the platform 32 with respect to the frame 35. As illustrated, the vertical support 56 is coupled to the frame 35 via three equal length links 47 on each side. Even though more or fewer links of varying length can be utilized in some constructions, the three links 47 are used in the illustrated construction to provide sufficient support and controlled movement. Specifically, the three equal length links 47 work in combination with the vertical support 56 and the frame 35 to provide a parallelogram four (or more) bar linkage. As such, the links will remain substantially parallel to each other throughout the range of movement of the platform 32. Also, the vertical support 56 and the platform 32 will maintain substantially the same orientation throughout the range of movement of the platform assembly 31 due to the parallelogram arrangement. This helps assure that loads placed on the platform 32 will not fall off of the platform 32 while being weighed.

Figure 9:
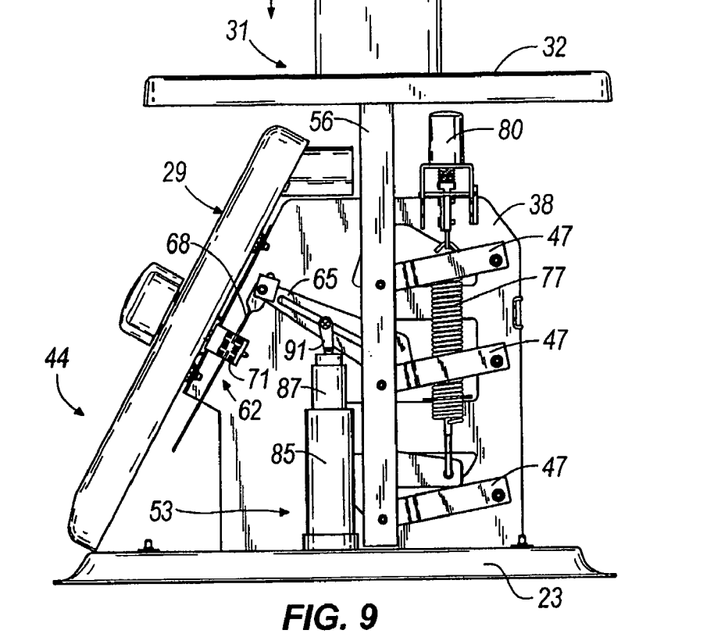
FIG. 9 is a side view similar to FIG. 8 showing the platform and components in a weight bearing position.

As illustrated in FIG. 9, the platform assembly 31 moves downwardly when a load is placed on the platform 32. As the platform assembly 31 moves downward, the indicator 59 on the dial 29 moves to indicate the weight of the load on the platform 32. In the illustrated construction, movement of the platform assembly 31 is transferred to the indicator 59 via a set of gears 62 and an arm 65. Specifically, an arm 65 is coupled to and extends from the platform assembly 31. The arm 65 can be coupled to the vertical support 56, to one or more links 47, etc. The arm 65 extends from the platform assembly 31 toward the backside of the dial 29. Near the backside of the dial 29, the arm 65 connects to the gear assembly 62. A rack 68 is connected to the arm 65, and the rack 68 is typically engaged with a pinion gear 71, which is coupled to the indicator 59. As the arm 65 moves downwardly with the platform assembly 31, the rack 68 also moves. Because the rack 68 is engaged with the pinion 71, the pinion 71 rotates as the rack 68 moves. Movement of the pinion 71 causes the indicator needle 59 to move relative to the dial 29.

As shown in FIGS. 6-9, the illustrated scale 20 has a spring assembly 50 that is used to limit, control, and/or measure the platform's movement. Specifically, at least one spring 77 having a selected spring constant can be attached between the platform assembly 31 and the frame 35 to resist movement of the platform 32 with a known force per unit of displacement. A first end of each spring can be coupled to the housing 26 or frame 35, and a second end can be coupled to the platform assembly 31. This arrangement places the spring 77 in tension when a load or object is placed on the platform 32. Because the spring 77 has a known spring constant, the dial can be scaled appropriately to accurately reflect the weight of a load or objects on the platform 32. Adjustment members 80 can be coupled to either end of the spring 77 to appropriately calibrate the scale 20 and/or adjust the zero position of the indicator 59. These adjustment members 80 allow the pre-tension force on the spring 77 to be adjusted.

Figure 10:
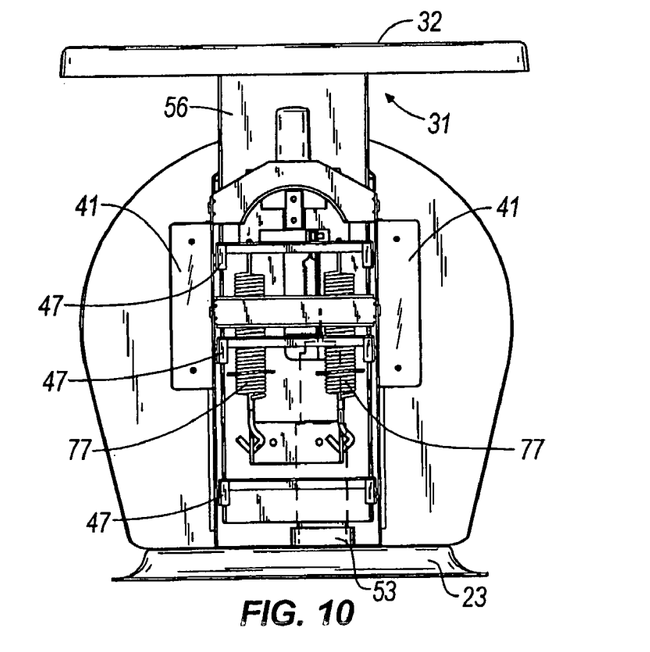
FIG. 10 is a rear view of the scale shown in FIG. 1 with the housing removed to reveal the relationship between inner components.
Figure 11:
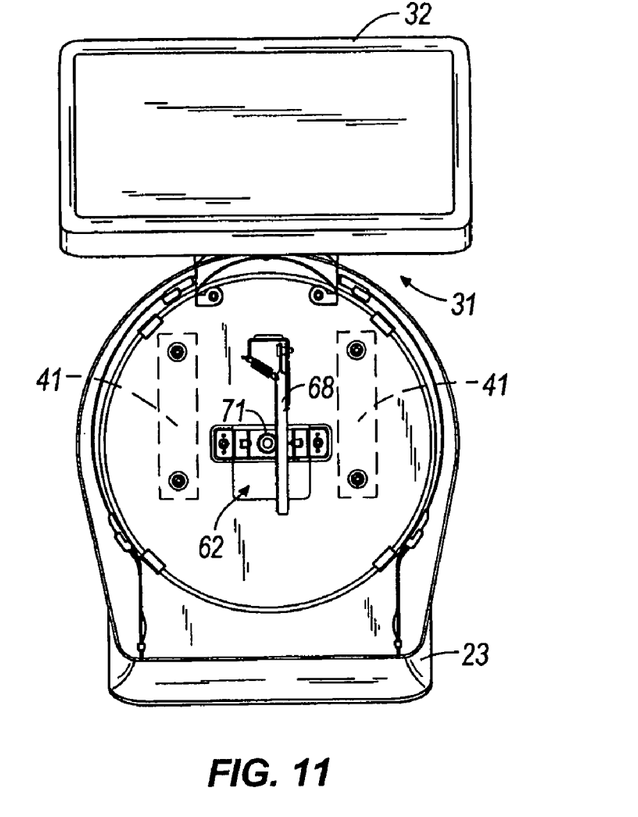
FIG. 11 is a view normal to the angled face of the scale's dial, with the front face removed to reveal the relationship between inner components.

As illustrated in FIG. 10, this construction utilizes two springs 77 to resist movement of the platform 32. In this construction, each spring 77 has substantially the same spring constant. However, in other constructions, the spring constant of each spring can be different. Furthermore, more or fewer springs can be used in other constructions. For example, some constructions may have one spring, while other constructions may have three or more springs depending upon, among other things, size and space constraints and the resistance desired.

Because the spring 77 is resilient, the use of a spring 77 within the scale 20 can cause the platform 32 and indicator 59 to oscillate for a period of time while the measurement is being taken. When the load on the platform 32 changes, the spring 77 tends to change length relatively quickly. Because the initial load on the platform 32 can include forces other than the weight of the load or objects on the platform 32, the spring 77 is generally stretched further than necessary. As such, the spring 77 oscillates for a period of time on either side of the true weight of the load. Friction and gravity naturally dampen the oscillation of over time. However, in some situations, scale operators do not want to wait for the oscillation to stop naturally.

Some constructions of the scale 20 can incorporate one or more devices to reduce or substantially eliminate this oscillation. For example, braking or dampening can be utilized to prevent oscillation. Specific constructions that incorporate braking or dampening will be discussed below.

Figure 12:
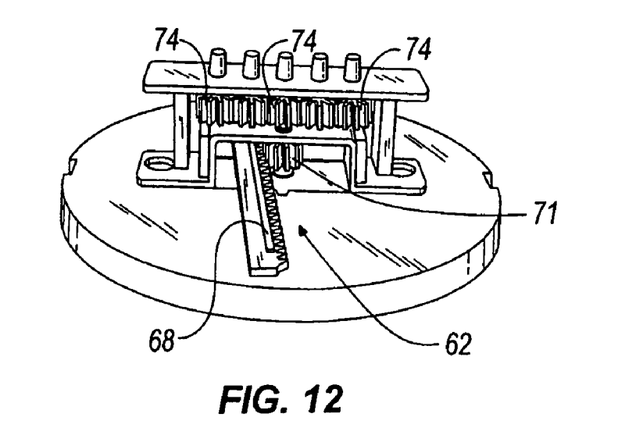
FIG. 12 is a perspective view of one construction of a gear assembly coupled to the indicator needle.

In some constructions of the scale 20, one or more gears 74 can be coupled to the rack 68 and/or the pinion 71 to reduce oscillation, as illustrated in FIG. 12. The gears 74 illustrated in this figure tend to slow the rotation of the pinion 71 and act as a brake to prevent oscillation of the indicator 59 by adding frictional and/or inertial resistance to prevent oscillation of the indicator 59. In some constructions, the gears 74 provide resistance only while the pinion 71 is moving in one direction. For example, the gears 74 can provide resistance only while the pinion 71 and needle 59 are moving in a direction to indicate the addition of weight to the scale platform 32. The gears 74 can utilize structure, such as, for example, one-directional roller bearings, a sprag clutch, or other free-wheel devices, to enable such capabilities. Such constructions apply a force to reduce oscillation when the load is added but does not apply force as the load is removed thereby allowing the indicator to return to zero position more easily, more quickly.

In some constructions, the gears 74 can be configured to engage the pinion 71 only while it is rotating in a first direction. Structure may be provided to cause the gears 74 to engage and disengage the pinion 71 depending upon the direction of rotation. For example, an actuator can be triggered by movement of the pinion or platform in a first direction to cause engagement of the gears 74 with the pinion 71.

In some constructions, engagement of the braking or dampening device can be delayed until the weight or force applied to the platform 32 exceeds a certain limit. Additionally, although the use of gears 74 has been described and illustrated, other devices can be used to slow the rotation of the pinion 71 either directly or indirectly. For example, interfacing surfaces can engage and disengage portions of one or more moving components within the scale to add predictable resistance.

Figures 21, 22, 23, 24:
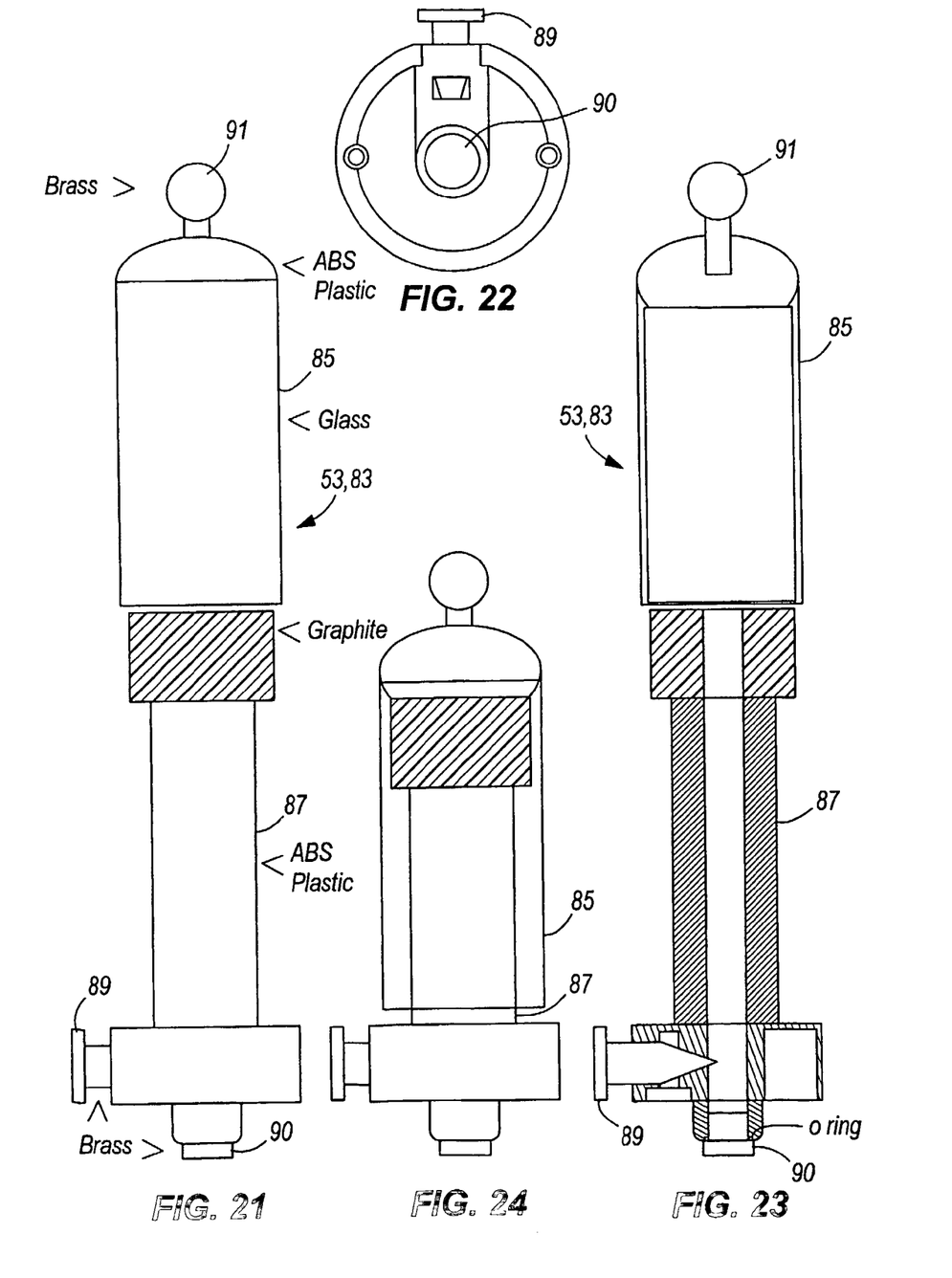
FIG. 21 is a side view of a dashpot embodying independent aspects of the present invention.
FIG. 22 is a bottom view of the dashpot illustrated in FIG. 21.
FIG. 23 is a cross-sectional side view of the dashpot illustrated in FIG. 21.
FIG. 24 is a side view of the dashpot illustrated in FIG. 21 with the piston shown in a retracted position relative to the cup, which is shown in phantom.

Some constructions employ a damper assembly 53 to substantially reduce or eliminate the amount of oscillation seen from the indicator 59. The damper assembly 53 can include a dash pot 83 having a fluid-filled chamber or cup 85 and plunger or piston 87 that moves within the chamber 85. The dashpot 83 generally works by forcing fluid through an orifice to dissipate kinetic energy. In the illustrated construction, air is used as the damping medium. As illustrated in FIGS. 21-24, the dashpot 83 can have an adjustment knob 89 to control the amount of damping or resistance the dashpot 83 provides by regulating fluid flow. This knob 89 at least partially controls the rate at which fluid can exit the cup 85 by adjusting the size of an opening in the cup through which fluid can exit. As illustrated in FIG. 23, a conical tip can be threaded adjusted relative to a conical aperture by turning the knob 89. In some constructions, the dashpot 83 also has a drain 90 to eliminate water that may accumulate in the cup 85. The drain 90 can be selectively opened and closed to allow any accumulated water to exit. As illustrated in FIG. 23, an o-ring or other seal can be positioned about the opening to prevent air leakage and the ingress of liquids.

Figure 7:
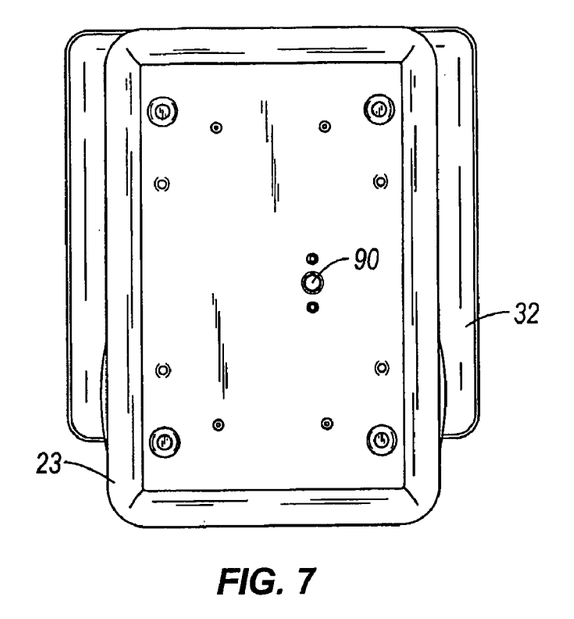
FIG. 7 is a bottom view of the scale shown in FIG. 1.
Figure 8:
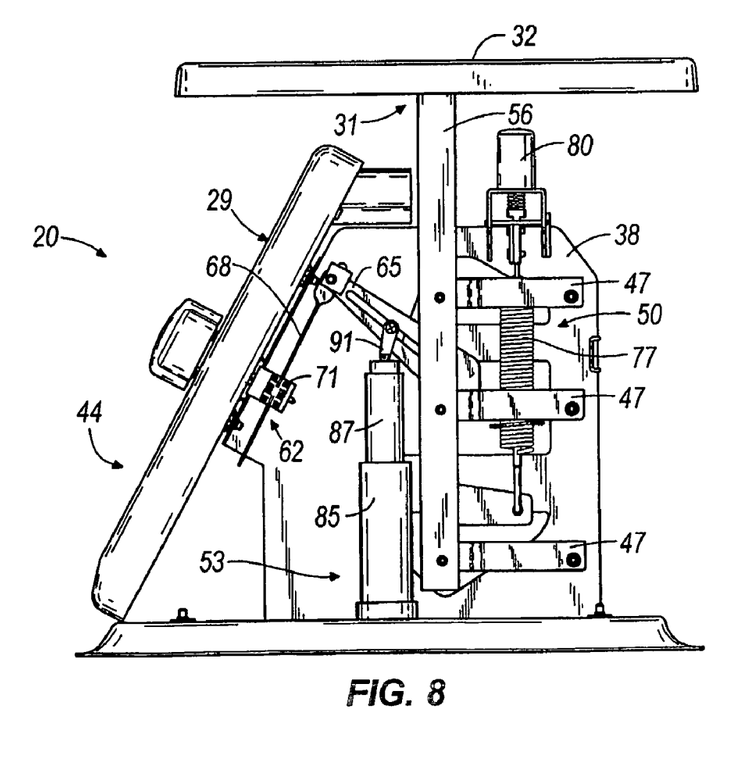
FIG. 8 is a side view of the scale shown in FIG. 1 with the housing removed to reveal the relationship between inner components.

The plunger 87 or cup 85 can be coupled to the platform assembly 31 along the vertical support 56, one of the links 47, or along an arm 65 extending from the vertical support 56. For example, as illustrated in FIGS. 8 and 9, the plunger 87 can be coupled to arm 65 through a link 91 extending between the plunger 87 and the arm 65. Consequently, the cup 85 is coupled to the frame 35. Although not illustrated, the cup 85 can be attached to one of the sidewalls 35 of the frame 35, or it can be attached to the base 23 of the frame 35 via a fastener. Furthermore, as illustrated in FIG. 7, in some constructions, the drain 90 is accessible through an aperture in the bottom of scale. Thus, the housing 26 does not need to be opened to remove water from the dashpot 83. In alternative constructions, the control knob 89 can be accessible through an aperture in the bottom of scale to allow adjustment of the damping force without the need to open the housing 26.

Although the construction shown in FIGS. 8 and 9 illustrates the cup 85 being fixed to the base and the plunger 87 being connected to the arm 65, in other constructions, the orientation of these two elements may be reversed. In other words, the plunger 87 can be fixed to the base, and the cup 85 can be connected to the arm 65 to move relative to the plunger 87. FIGS. 21-24 illustrate the construction of dashpot that is adapted to be placed in this orientation. This alternative construction may help prevent the accumulation of water or other debris within the dashpot 83. Because the plunger 87 moves within the cup 85, water or debris cannot rest along the exterior interface between these two elements when the cup 85 is positioned above the plunger 87. Regardless of the orientation of the cup 85 relative to the plunger 87, if provided, is positioned to drain at a lowest position within the dashpot 83.

Figure 13A:
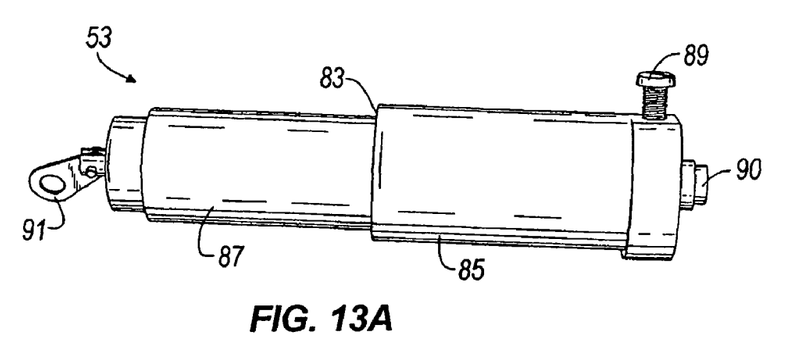
FIG. 13A is a side view of a dashpot in an extended position.
Figure 13B:
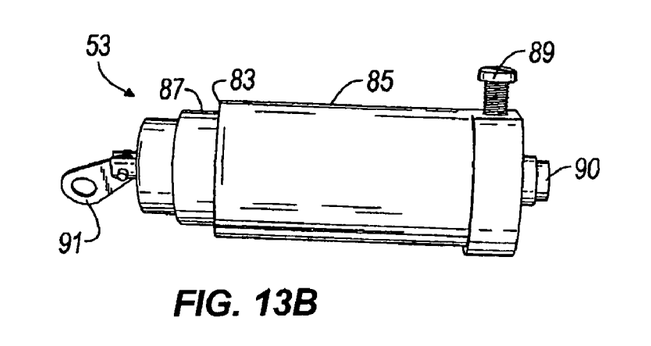
FIG. 13B is a side view of a dashpot in a compressed position.
Figure 14:
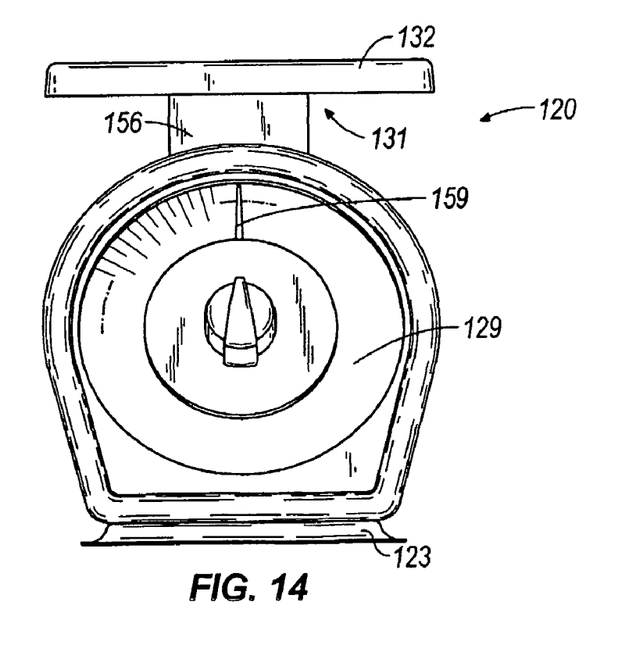
FIG. 14 is a front view of another constructions of a scale.
Figure 15:
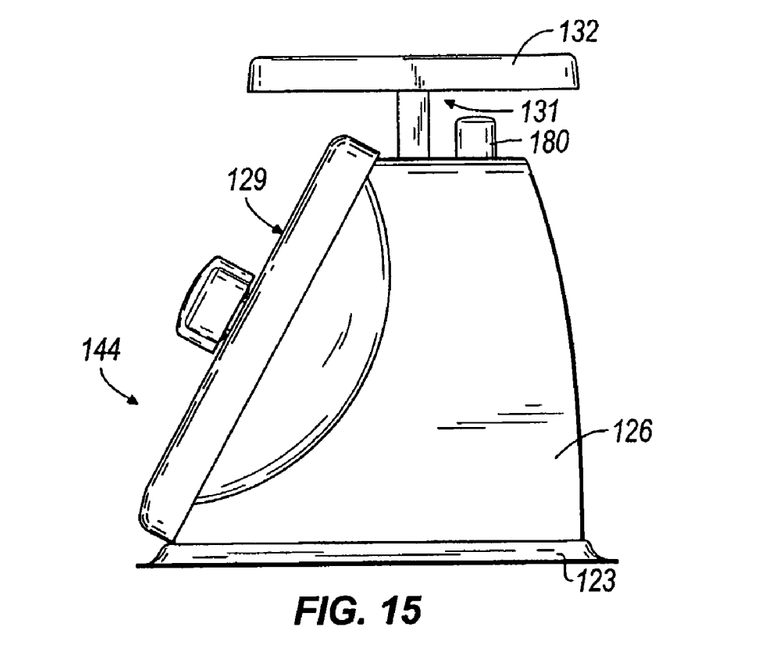
FIG. 15 is a side view of the scale illustrated in FIG. 14.
Figure 16:
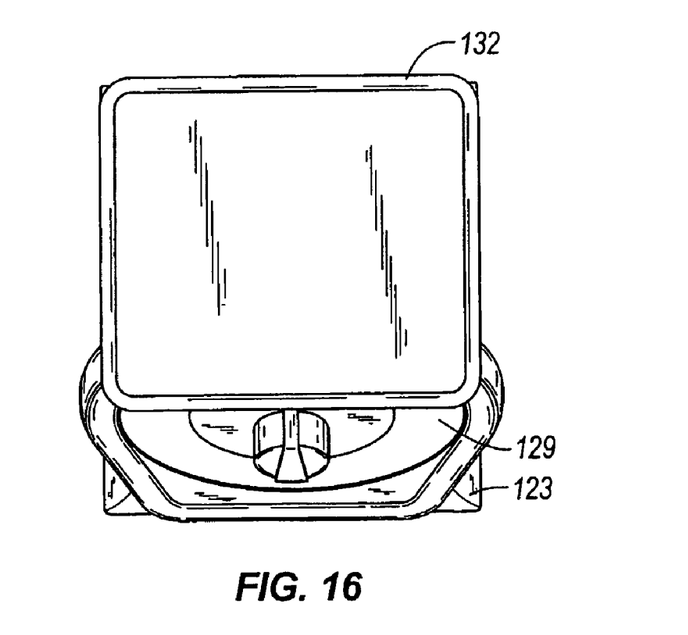
FIG. 16 is a top view of the scale illustrated in FIG. 14.
Figure 17:
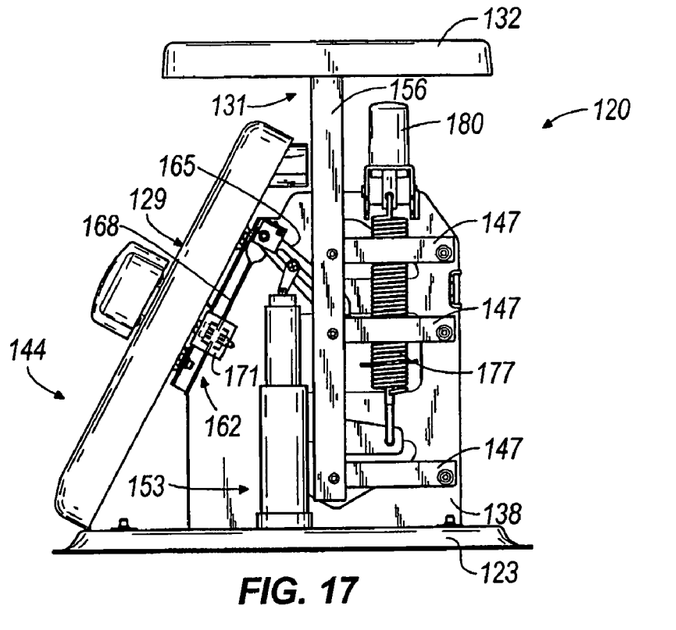
FIG. 17 is a side view of the scale illustrated in FIG. 14, shown with the housing removed to reveal the relationship between inner components.
Figure 18:
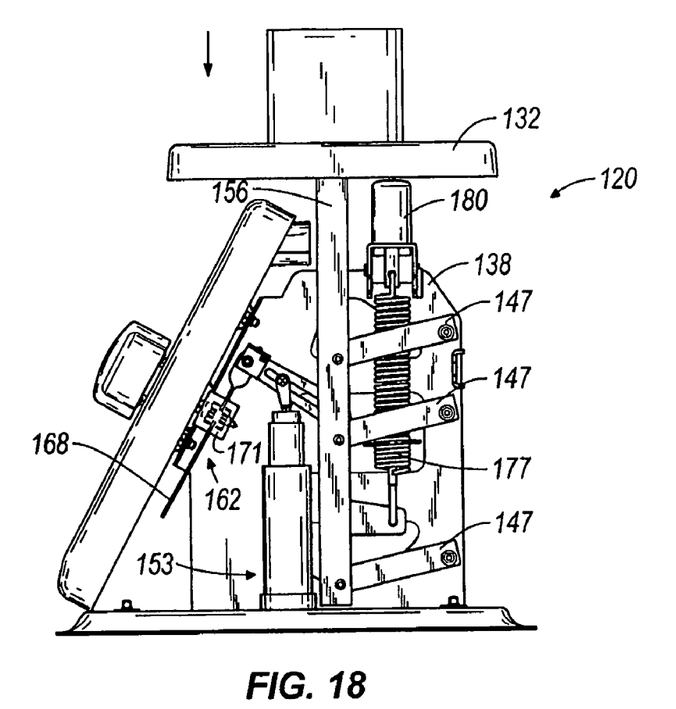
FIG. 18 is a side view similar to FIG. 17 showing the platform and components in a weight bearing position.
Figure 19:
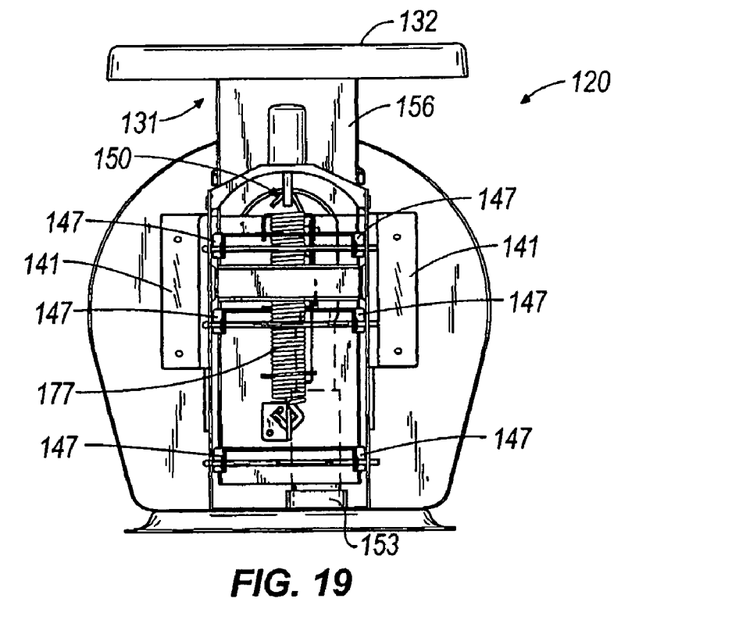
FIG. 19 is a rear view of the scale illustrated in FIG. 14, shown with the housing removed to reveal the relationship between inner components.
Figure 20:
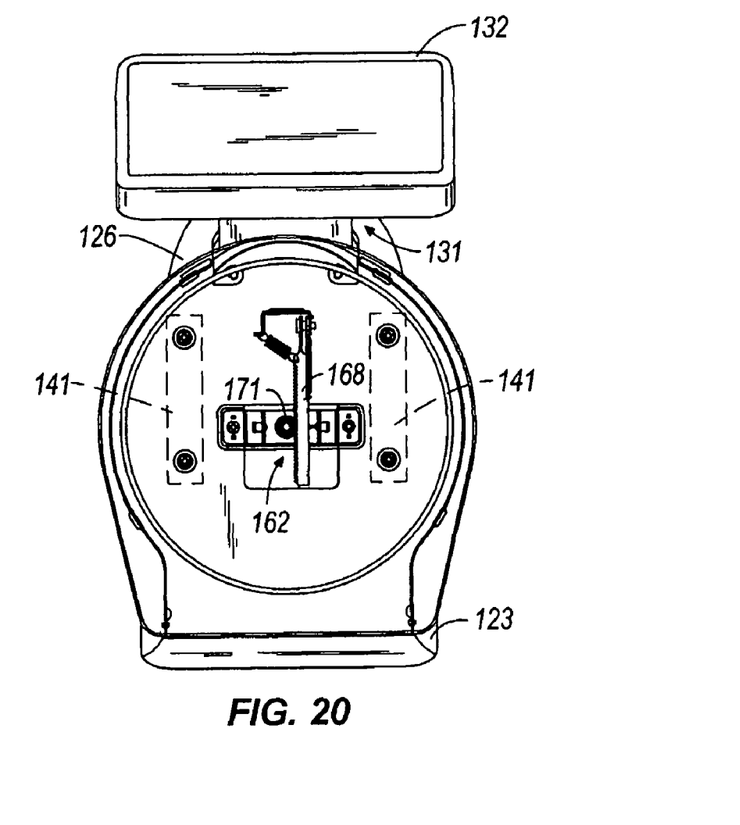
FIG. 20 is a view normal to the angled face of the scale's dial, with the front face removed to reveal the relationship between inner components.

In some industries, such as the food service industries, the design of the components of the scale discourages or inhibits the collection of debris and water. Thus, the dashpot 83 of some constructions can be designed to eliminate or reduce the number of surfaces on which debris and water can collect. Specifically, as illustrated in FIGS. 21-24, the vertical end of the dashpot 83 can be rounded or semi-spherically shaped, unlike the flat ends illustrated in FIGS. 13A and 13B. Additionally, transitions can be contoured to eliminate ledges, bowls, and other apertures to collect water and debris.

Although the dashpot 83 can be constructed from materials that are conventionally used with dashpots, it may be preferable to construct the dashpot from alternative materials in some construction and for some uses. For example, some dashpots 83 tend to have a cup 85 formed from glass or PYREX® glassware and a plunger 87 formed from graphitized carbon. However, if the dashpot 83 were used in a kitchen for example, a glass cup 85 may not be a preferred option because the potential for breakage could place food at risk. Thus, some constructions utilize a cup 85 made from DELRIN® acetal resin, which is a light weight but durable, low wear, low friction plastic sold by DuPont of Wilmington, Del. Also, by using DELRIN® acetal resin, temperature changes do not substantially affect the functionality of the dashpot 83. Some constructions use DELRIN® acetal resin for both the cup 85 and the plunger 87 of the dashpot 83. Some constructions use DELRIN® acetal resin for only portions of the dashpot. For example, some constructions may have a glass cup 85 and a plunger 87 formed partially of DELRIN® acetal resin and partially of graphite. Specifically, the head of the plunger 87 that interfaces with the glass cup 85 can be made of graphite while the remainder of the plunger 87 can be made of DELRIN® acetal resin. Also, the cylindrical body of cup 85 can be made from glass while the semi-spherical head can be made from DELRIN® acetal resin.

In operation, as the platform 32 moves, the plunger 87 moves relative to the cup 85. The cup 85 contains a fluid (either hydraulic or pneumatic type fluids) that is compressed and/or forced through a relatively small aperture in the cup 85 due to the relative movement of the cup 85 and the plunger 87, and this dampens the shock of a load placed on the platform 32 and prevents or quickly eliminates oscillation of the platform 32. It should be understood that many different types of dampers can be scaled or adjusted to work with the scale.

FIGS. 14-20 illustrate another construction of a scale 120 that is substantially similar to the previously illustrated constructions. As such, generally only the differences between this construction and the previous constructions will be discussed in detail.

For example, the housing 126 of the construction illustrated in FIGS. 14-20 is smaller than the housing 26 of the construction illustrated in FIGS. 1-11. Specifically, the housing 26 illustrated in FIGS. 1-11 has a greater depth, which consequently provides a larger more stable base. Additionally, although it is not illustrated, a scale with a larger, more stable base may by able to accommodate a larger platform. The variation in size between constructions can be contributed to several factors. For example, some constructions may require a larger damper assembly 53 or 153, a larger spring assembly 50 or 150, a larger gear assembly 162, etc. The larger housing 26 of the previous constructions accommodates at least one of those differences. Specifically, the construction illustrated in FIG. 10 utilizes two springs 77 while the construction in FIG. 19 only utilizes one spring.

The embodiments and constructions described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, various alternatives to the certain features and elements of the present invention are described with reference to specific embodiments of the present invention. With the exception of features, elements, and manners of operation that are mutually exclusive of or are inconsistent with each embodiment or construction described above, it should be noted that the alternative features, elements, and manners of operation described with reference to one particular embodiment or constructions are applicable to the other embodiments or constructions.

One or more independent features and independent advantages of the present invention are set forth in the following claims:

We claim:

1. A scale comprising:
   a base supportable on a surface;
   a frame supported by the base;
   a measuring mechanism supported by the base and operable to measure a characteristic of an object, the measuring mechanism including a measuring platform on which the object is supportable and a damper assembly to resist movement of the platform;
   an indicator supported by the frame, the indicator being operable to provide feedback to a user relating to a measured characteristic of the object;
   a housing supported by and removable from the base, the housing cooperating with the base to cover the damper assembly; and
   a connecting assembly operable to removably connect the housing to the base;
   wherein the frame is configured to support the measuring platform, the damper assembly, and the indicator such that the scale is operable with the housing removed from the base.

2. The scale of claim 1, wherein the frame is fixed to the base, and wherein the measuring mechanism and the indicator are connected to the frame or the base as a unit.

3. The scale of claim 2, wherein the housing is removable from the unit.

4. The scale of claim 1, wherein the platform is movable relative to the base to measure the characteristic of the object.

5. The scale of claim 1, wherein the scale has a front, a rear, a bottom, a first side and a second side, wherein the indicator provides at least a portion of the front, wherein the base provides at least a portion of the bottom, and wherein the housing provides at least a portion of the rear, the first side and the second side.

6. The scale of claim 5, wherein the housing has a rear surface and a forward surface extending forwardly of the rear surface, the forward surface extending from a first edge on the first side to a second edge on the second side, the forward surface being contoured to provide a smooth transition from the first side to the second side.

7. The scale of claim 1, wherein the connecting assembly includes a first connecting member provided by the base and a second connecting member being engageable to releasably connect the housing to the base.

8. The scale of claim 7, wherein the first connecting member includes a fastener, wherein the second connecting member includes a recess defined by a portion of the housing, the fastener being engageable in the recess to releasably connect the housing to the base.

9. The scale of claim 1, wherein the housing is formed of a dishwasher safe material.

10. The scale of claim 1, wherein the base, the measuring mechanism and the indicator are formed at least partially of a dishwasher safe material.

11. A scale comprising:
a base supportable on a surface;
a frame supported by the base;
a measuring mechanism supported by the base and operable to measure a characteristic of an object, the measuring mechanism including a measuring platform on which the object is supportable;
an indicator supported by the frame, the indicator being operable to provide feedback to a user relating to a measured characteristic of the object;
a resistance device coupled to the indicator or the measuring mechanism and operable to resist oscillation of the indicator during a measurement or after a measurement; and
a housing supported by and removable from the base, the housing cooperating with the base to cover the resistance device;
wherein the frame is configured to support the measuring platform, the indicator, and the resistance device such that the scale is operable with the housing removed from the base.

12. The scale of claim 11, wherein the resistance device provides friction resisting movement of the indicator.

13. The scale of claim 11, wherein the resistance device provides inertia resisting movement of the indicator.

14. The scale of claim 11, wherein the resistance device includes a gear coupled to the indicator and operable to resist movement of the indicator.

15. The scale of claim 14, wherein the indicator includes a pointer pivotably supported by the frame and a rack and pinion assembly connected between the platform and the pointer and operable to communicate movement of the platform to the pointer, the damping gear being in communication with the rack and pinion assembly.

16. The scale of claim 15, wherein the rack and pinion assembly includes a pinion connected to the pointer for pivoting movement with the pointer and a rack connected to the platform for movement with the platform.

17. The scale of claim 11, wherein the resistance device is operable to resist oscillation of the indicator during a measurement and does not operate to resist oscillation of the indicator after a measurement.

18. A scale comprising:
a base supportable on a surface;
a frame supported by the base;
a measuring mechanism supported by the base and operable to measure a characteristic of an object, the measuring mechanism including a measuring platform on which the object is supportable;
an indicator supported by the frame, the indicator being operable to provide feedback to a user relating to a measured characteristic of the object;
a cylinder supported by the frame; and
a piston connected to the platform for movement with the platform, the piston engaging the cylinder to provide a piston and cylinder assembly, the piston and cylinder assembly being operable to resist movement of the platform during a measurement or after a measurement; and
a housing supported by and removable from the base, the housing cooperating with the base to cover the piston and cylinder assembly;
wherein the frame is configured to support the measuring platform, the indicator, and the piston and cylinder assembly such that the scale is operable with the housing removed from the base.

19. The scale of claim 18, wherein the cylinder defines a chamber, and wherein the scale further comprises a control mechanism operable to control a flow of fluid from the chamber during movement of the piston relative to the cylinder.

20. The scale of claim 19, wherein the control mechanism includes an opening defined by the cylinder and communicating with the chamber and a control member operable to control the size of the opening.

21. The scale of claim 20, wherein the control mechanism includes a control actuator engageable by a user to control the size of the opening.

22. The scale of claim 18, wherein the cylinder defines a chamber, and wherein the scale further comprises a drain operable to remove contaminants from the chamber.

23. The scale of claim 18, wherein the piston includes a head engageable in the cylinder and a plunger connected between the head and the platform, and wherein the head is formed of graphite and the cylinder is formed of glass.

24. The scale of claim 1, wherein a portion of the measuring mechanism covered by the housing is formed of a dishwasher safe material.

25. The scale of claim 11, wherein the resistance device includes a damper assembly.

26. A scale comprising:
a housing supportable on a surface;
a measuring mechanism supported by the housing and operable to measure a characteristic of an object, the measuring mechanism including a measuring platform on which the object is supportable;
an indicator supported by the housing, the indicator being operable to provide feedback to a user relating to a measured characteristic of the object, the indicator being movable relative to the housing to provide the feedback; and
a resistance device coupled to at least one of the indicator and the measuring mechanism and operable to resist oscillation of the indicator at least one of during a measurement and after a measurement;
wherein the resistance device includes a gear coupled to the indicator and operable to resist movement of the indicator.

27. The scale of claim 26, wherein the indicator includes a pointer pivotably supported by the housing and a rack and pinion assembly connected between the platform and the pointer and operable to communicate movement of the platform to the pointer, the damping gear being in communication with the rack and pinion assembly.

28. The scale of claim 27, wherein the rack and pinion assembly includes a pinion connected to the pointer for pivoting movement with the pointer and a rack connected to the platform for movement with the platform.

* * * * *